United States Patent [19]

Chatham

[11] Patent Number: 4,468,752
[45] Date of Patent: Aug. 28, 1984

[54] DATA SYNCHRONIZATION APPARATUS

[75] Inventor: Dale Chatham, Fort Worth, Tex.

[73] Assignee: Tandy Corporation

[21] Appl. No.: 303,942

[22] Filed: Sep. 21, 1981

[51] Int. Cl.³ .......................... G06F 3/00; H04L 3/00;
G11B 5/06; G08C 25/00
[52] U.S. Cl. .................................... 364/900; 375/110;
375/116; 360/44; 360/51; 370/100; 371/47
[58] Field of Search ... 364/200 MS File, 900 MS File;
375/106, 110, 113, 114, 116; 360/40, 42, 43, 44,
51; 370/100; 371/47

[56] References Cited

U.S. PATENT DOCUMENTS

| | | | |
|---|---|---|---|
| 3,395,355 | 7/1968 | Gabor | 360/43 |
| 3,737,896 | 6/1973 | Gabor | 360/43 |
| 3,838,214 | 9/1974 | Lind | 375/110 |
| 3,921,009 | 11/1975 | Comas et al. | 360/44 |
| 3,938,082 | 2/1976 | Schowe, Jr. | 371/47 |
| 3,959,816 | 5/1976 | Spiecens | 360/44 |
| 4,032,915 | 6/1977 | Shanks et al. | 360/44 |
| 4,051,539 | 9/1977 | Geddes et al. | 360/44 |
| 4,080,572 | 3/1978 | Hastings et al. | 375/95 |
| 4,112,501 | 9/1978 | Önnestam | 364/900 |
| 4,267,595 | 5/1981 | Hernandez | 360/43 |
| 4,302,845 | 11/1981 | McClaughry et al. | 375/95 |
| 4,320,525 | 3/1982 | Woodward | 360/42 |
| 4,347,606 | 8/1982 | Hoogeveen | 375/116 |

OTHER PUBLICATIONS

'Mon 1.1 Enhancement Description', Synertek Systems Corp., First Printing, 1979.
'A Software Controlled 1200 bps Audio Tape Interface', Byte, Apr., 1977, vol. 2, No. 4, by Carl Helmers.
'The Designer's Eye View of the AC-30', by Gary Kay, Byte, Dec. 1976, No. 16.
Apple II Reference Manual, Apple Computer Inc., 'Apple II System Monitor', 1977.

Primary Examiner—Jerry Smith
Assistant Examiner—William G. Niessen
Attorney, Agent, or Firm—Wolf, Greenfield & Sacks

[57] ABSTRACT

Data synchronization apparatus for a 1500 baud computer-audio frequency magnetic tape recorder interface is disclosed. The synchronization apparatus automatically detects bit cell boundaries and synchronizes at both the bit level and the byte level even if the audio waveform as read from the tape is inverted, as is the case with some tape recorders. Synchronization is performed by converting the audio waveform into a square wave and examining the square wave for predetermined pulse patterns. If one pattern is found, the positive-going edge of the waveform is selected as the bit cell boundary. If, on the other hand, another pattern is found, negative-going edges are selected as bit cell boundaries. Synchronization is achieved on a byte level by shifting incoming data into a first-in/first-out buffer and examining the stored data for a predetermined bit pattern.

19 Claims, 6 Drawing Figures

DATA SYNCHRONIZATION APPARATUS

FIELD OF THE INVENTION

This invention relates to digital synchronization apparatus and, in particular, to apparatus for obtaining synchronization of decoding apparatus to a serial stream of digital data.

BACKGROUND OF THE INVENTION

Many small computers utilize an audio-frequency magnetic tape recorder as an inexpensive auxiliary data storage device. In order to utilize an audio tape recorder in this manner, an interface circuit is provided between the computer and the tape recorder which converts digital signals produced by the computer into audio-frequency tone signals that can be recorded on magnetic tape by the recorder audio circuitry. Typically, a digital signal which represents a logical "one" is converted to an audio tone of a predetermined frequency. A digital signal which represents a logical "0" is converted to an audio tone of a different predetermined frequency. The audio tones produced by the tape recorder interface can then be conveniently stored on inexpensive audio magnetic tape.

Subsequently, the recorded information can be retrieved from the tape by "playing back" the tape and reconverting the resulting audio tones into digital signals suitable for use by the associated computer.

In order to achieve reasonable information recording density on the magnetic tape only a single cycle of each audio frequency is used to represent a digital "bit". Therefore, the serial stream of audio information which is retrieved from the tape consists of a frequency-modulated waveform containing a pattern of various frequencies corresponding to the digital pattern of "1"s and "0"s in the information originally stored on the magnetic tape.

While audio tape storage is inexpensive and reliable, a synchronization problem can occur because some audio tape recorders cause an inversion of the audio signal when a stored signal is retrieved from the tape. Other tape recorders do not invert the signal when the stored information is retrieved. Whether an inversion occurs depends on specific read circuitry in the tape recorder and may vary from brand to brand and among different models in the same brand of tape recorders. An inversion can prevent the computer-tape recorder interface from properly synchronizing to the audio signal output from the cassette recorder so that a conversion can be performed between the audio signals on the digital levels required by the associated computers.

One simple prior art solution to the inversion problem is an inverting switch. When an inverting switch is used the recorder interface first attempts to synchronize to the incoming signal and if synchronization does not occur the switch must be manually moved to invert the waveform and allow synchronization to take place. This approach is inconvenient and, in some cases, the operator of the computer may not be aware of the source of the problem and, therefore, may not be able to correct it.

It is, therefore, an object of this invention to provide cassette interface synchronization circuitry which can synchronize to a waveform whether the waveform is inverted or not.

It is a further object of the invention to perform synchronization with simplified circuitry.

It is a still further object of the invention to perform the synchronization automatically without the need for manual operator intervention.

SUMMARY OF THE INVENTION

The foregoing problem is solved and the foregoing objects are achieved in one illustrative embodiment of the invention in which the time durations of the positive and negative portions of an audio-frequency signal from a tape recorder are measured and means are provided for detecting predetermined patterns of pulse widths. If one pattern is found, the bit cell boundary is considered to be a signal transition of one sense. If another pattern is found, the signal transitions of the opposite sense are used as bit cell boundaries. The system then achieves byte synchronization by shifting the incoming information into a shift register and checking the stored bits for a predetermined pattern.

More specifically, the positive and negative portions of the incoming audio waveform are timed and compared against a predetermined decision point. Timing is continued until the system detects a pulse width combination consisting of a "narrow" pulse (having a duration less than the decision point) followed by a "wide" pulse (having a width greater than the decision point). If the pulse pattern is a narrow "high" pulse followed by a wide "low" pulse falling edges are chosen as bit cell boundaries. If, on the other hand, the pulse pattern is a narrow "low" pulse followed by a wide "high" pulse, then rising edges are chosen as bit cell boundaries. In the illustrative embodiment pulse timing and comparisons are done by software routines in the computer.

DETAILED DESCRIPTION OF THE INVENTION

Figure 1:
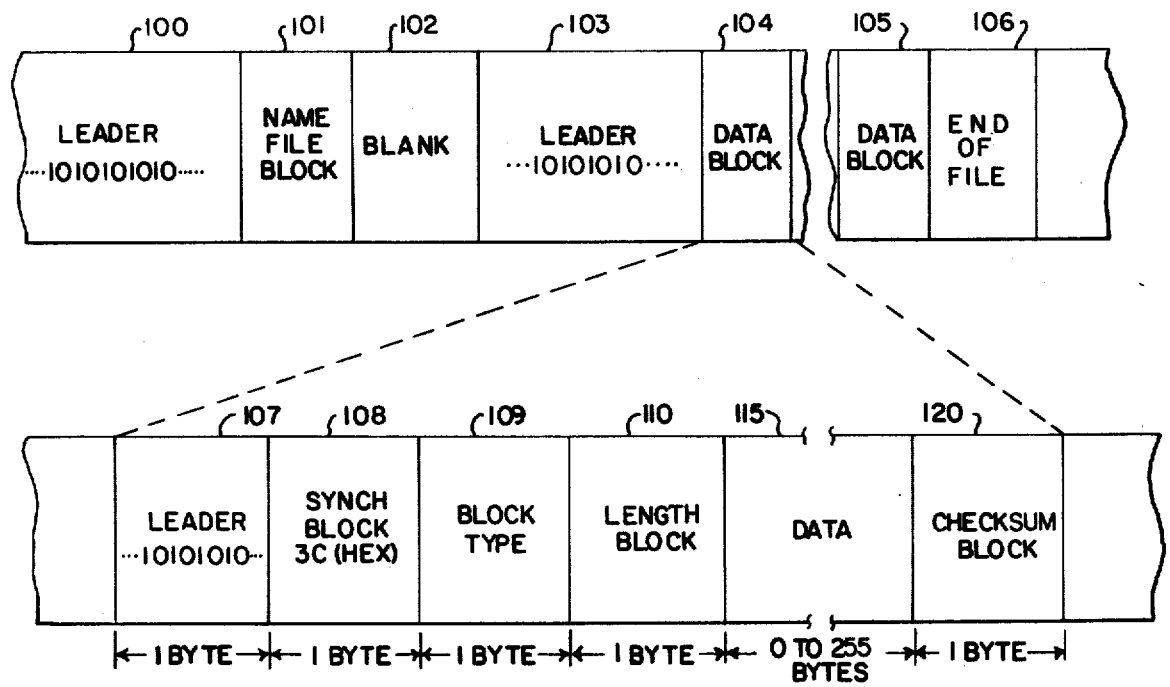
FIG. 1 shows a typical arrangement of synchronization information, identification information and data on a magnetic tape suitable for use with the inventive sychronization circuitry.
Figure 2:
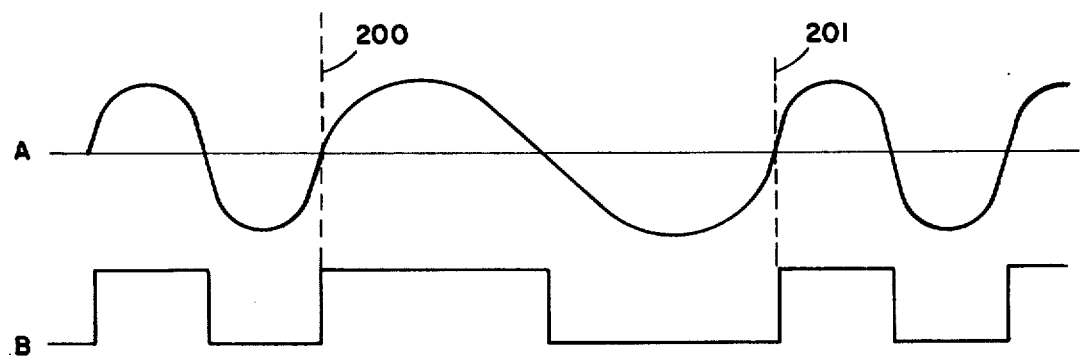
FIG. 2 shows a typical incoming audio waveform produced by an audio-frequency tape recorder when stored digital data is played back and the squared waveform produced from that waveform.
Figure 3:
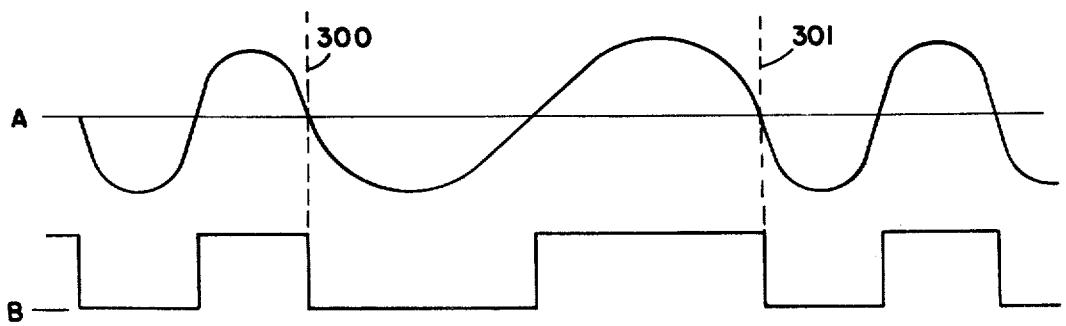
FIG. 3 shows an inverted audio waveform and the squared signal produced by the waveform.

FIG. 1 of the drawing shows a schematic diagram of a length of magnetic tape on which digital data has been recorded. As mentioned previously, when this tape is used in conjunction with an audio-frequency tape recorder, data is actually stored as patterns of audio-frequency signals which are processed by the tape recorder circuitry to produce a series of audio-frequency tones upon playback. The circuitry which performs the actual conversion between digital signals and the audio-frequency tones is well known and will not be explained in detail herein. The digital-to-frequency converter may illustratively consist of a stored table of digital values representative of sampled amplitudes of sine waves of appropriate frequencies. When a conversion takes place, a computer or other sequencer sequentially provides the stored values to a standard digital-to analog converter. A series of analog signals results which, after appropriate filtering, produce an audio-frequency sine wave of appropriate frequency. Frequency to digital conversion can be accomplished by a simple zero-crossing and limiter circuit which converts incoming audio-frequency sine waves into digital signals as shown in FIGS. 2 and 3. After synchronization takes place, via the illustrative synchronization circuit, digital "1"s and "0"s can be detected by timing the durations of the waveforms (i.e. the time duration between two rising or falling edges depending on which edge sense corresponds to bit cell boundaries) and comparing the timed durations against predetermined limits.

In order that synchronization can take place and data on the tape can be accurately located and retrieved, certain synchronization and identification information is also recorded on the tape.

Specifically, a fixed synchronization pattern is imbedded in the data, both in "leader" 100 located at the beginning of the magnetic tape and in "header" 107 located immediately before the data to be retrieved. Typically, the synchronization pattern in leader 100 consists of 128 bytes of alternating digital "1"s and "0"s.

After leader 100 is located name file block 101 in which a name associated with the tape is stored. Name file block 101 is followed by a blank space 102 on the tape that allows the computer software to evaluate the name stored in block 101. An additional synchronization leader consisting of 128 bytes of digital "1"s and "0"s follows blank space 102. Leader 103 is, in turn, followed on the tape by a plurality of data blocks of which only two (blocks 104 and 105) are shown. Finally, an "end of file" block is located at the physical end of the tape which, when read, informs the associated computer that it has reached the end of the tape.

Each of blocks 101 through 106 is also subdivided into a number of synchronization and identification blocks which enable the computer to interpret the stored information and retrieve the stored data. The format of each block is identical and for clarity only data block 104 is shown in detail.

In particular, each block begins with a header 107 which typically consists of one byte of code 55 in hexadecimal notation which is equivalent to one byte of alternating "1"s and "0"s. Header 107 is followed by a synchronization block 108. This block contains a predetermined pattern which, as will be described in more detail below, is used to obtain byte synchronization. Typically this pattern is 3C in hexadecimal notation which is equivalent to the binary pattern 00111100.

Synch block 108 is followed by a block type identification block 109 which contains information which indicates whether the block is a name file block, a data block or an end of file block. The type block is, in turn, followed by a length block 110 which indicates the number of data bytes which follow.

The length block 110 is followed by the actual data which may be from 0 to 225 bytes in length in the illustrative embodiment. Each block is terminated by a checksum block 120 which contains information allowing for error correction.

A portion of an audio waveform which is produced by the tape recorder circuitry when the synchronization pattern in the leader or header of the tape shown in FIG. 1 is read is shown in FIG. 2, line A. Typically, in a medium speed interface, for example, 1500 baud, digital "1"s are encoded as an audio signal at approximatly 2400 hertz and digital "0"s are recorded at an audio signal having a frequency of 1200 hertz. Each digital bit is represented by a single cycle of the corresponding audio frequency.

Since the audio waveform is continuous, in order to synchronize to such a waveform, the synchronization circuitry must determine the location of bit cell boundaries designated as 200 and 201 in FIG. 2. To begin the synchronization process, the audio waveform is first converted into a digital waveform by a zero crossing detector and limiting circuit, resulting in the waveform shown in line B of FIG. 2. This waveform has a "high" level when a positive excursion of the waveform shown on line A occurs and a "low" level when a negative excursion of the waveform shown in line A occurs.

A comparison of lines A and B of FIG. 2 shows that the bit cell boundaries occur on the postive-going transitions of the waveform in line B.

However, as discussed previously, due to the properties of some tape recorders, it is possible that the waveform recorded as shown in line A of FIG. 2 may in fact be played back with an inversion as shown in line A in FIG. 3. When the waveform shown in line A of FIG. 3 is passed through zero crossing and limiter circuitry the waveform shown in FIG. 3, line B is produced. In this waveform, bit cell boundaries occur on the negative-going transitions of the waveform.

Unfortunatley, it is not possible for the system to know in advance whether a particular tape recorder being used with the computer has an inversion or not; therefore, it is not possible for the system to know in advance whether to use positive-going or negative-going transistions as bit cell boundaries.

In order to select a transition in the proper sense as a bit cell boundary, the inventive synchronization apparatus uses a simple computer routine which computes the duration of the time intervals of successive pulses. By comparing the durations of these pulses with a preestablished limit, the apparatus can decide whether positive-going or negative-going transitions should be used as bit cell boundaries.

Specifically, the computer communicates with the tape recorder interface circuitry by means of a "port". Audio information which is read from the magnetic tape by means of the tape recorder circuitry is provided to a zero-crossing detector and limiter circuit which converts the audio waveform (which is composed of portions of sine waves) into a square wave as shown in FIGS. 2 and 3. The square wave signal is provided to the port circuitry which includes a data buffer that is periodically interrogated by the computer. The computer can then check the status of the data at the port (whether it is "high" or "low") by loading the data present at the port into an internal register and comparing it against predetermined numbers.

Figure 4:
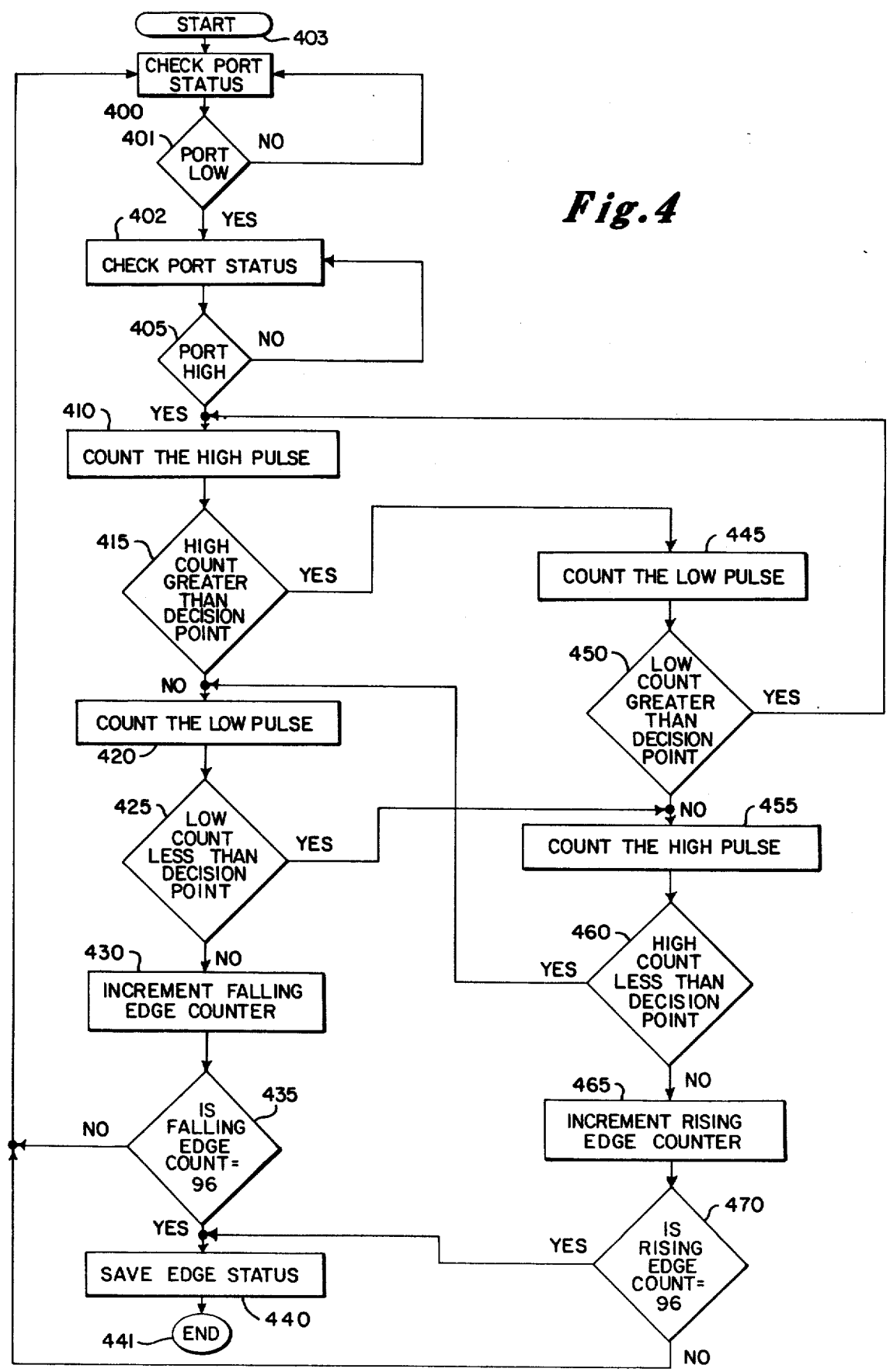
FIG. 4 is a flow chart of the software program used in the computer to achieve synchronization.
Figure 5:
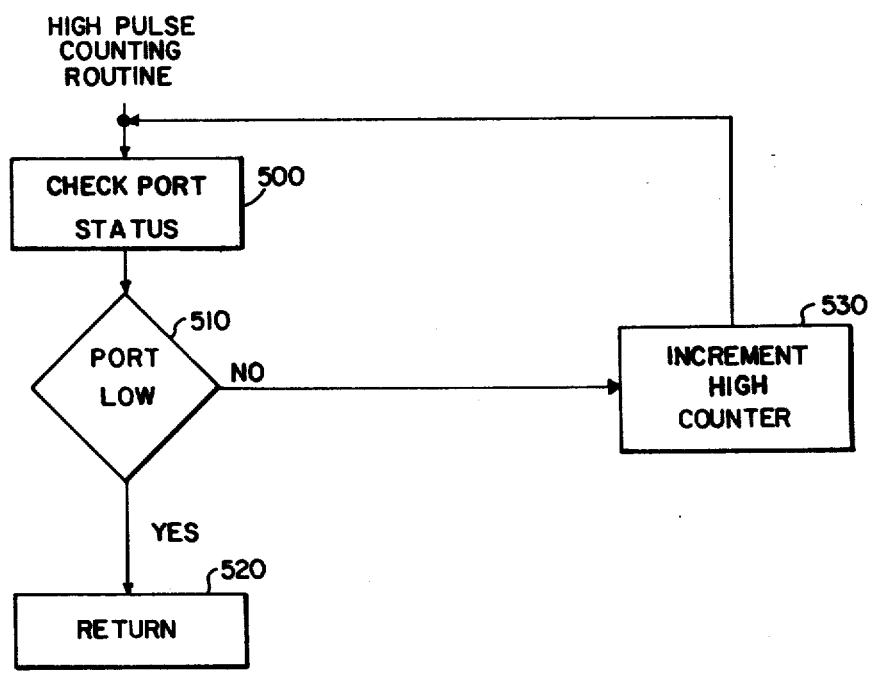
FIG. 5 is a flow chart of a software subroutine program used in the computer to time the duration of the "high" pulses.
Figure 6:
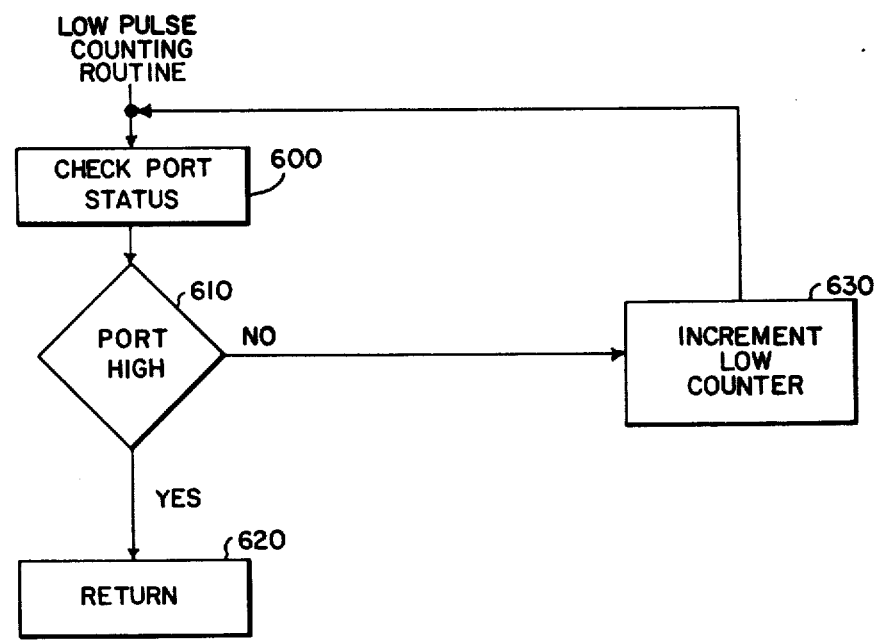
FIG. 6 is a flow chart of a software subroutine program used in the computer to time the duration of the "low" pulses.

FIG. 4 of the drawings shows a flowchart for a software program routine which enables a computer to detect various pulse patterns and make a decision as to whether rising or falling edges should be used as bit cell boundaries. The routine shown on FIG. 4 uses two subroutines which are shown in FIGS. 5 and 6 which will be described in further detail hereinafter. The computer routines shown in flowchart form in FIGS. 4, 5 and 6 can be programmed in computer languages suitable for many computers using well-known techniques. An example of an actual code for such routines is shown hereinafter.

In particular, to begin the synchronization routine, the computer must first detect a rising edge in the input signal. The waveforms as shown in line B of FIGS. 2 and 3, consisting of a series of digital "pulses", is applied to an input port to which the computer has access. The computer first detects a rising edge by examining the time sequence of information present at the input port. It does this by performing the routine shown in FIG. 4, starting at entry point 403 and executing steps 400, 401, 402 and 405.

Specifically, the computer first checks the status of the port connected to the tape recorder by reading the present value of the data at the port as schematically illustrated in step 400. It makes a decision whether the data is "low" as shown in step 401. If the data is not "low", the computer rechecks the port status and continues until the data at the port becomes "low". The computer then proceeds to step 402 where it again checks the port status and to step 405 where it determines when the data has become "high". When a "low" to "high" transition occurs, the computer proceeds to analyze the succeeding series of pulses to detect a predetermined pattern which indicates whether a rising or falling edge should be used for a bit cell boundary by performing step 410.

In step 410, the computer begins timing the duration of the succeeding "high" pulse by performing the high pulse counting subroutine as shown in FIG. 5 (which will be discussed in more detail hereinafter).

The high pulse counting subroutine produces a number whose value is proportionally related to the duration of the high pulse. In step 415, the number produced by the high pulse counting routine is compared to a predetermined decision number or decision point. The decision point is used to determine whether the pulse is a "narrow" pulse (having a duration shorter than the predetermined decision point) or a "wide" pulse (having a duration longer than the predetermined decision point). Since, as previously explained, a typical 1500 baud tape recording scheme uses frequencies of 1200 hertz and 2400 hertz to represent digital "0"s and "1"s, respectively, wide pulses are approximately twice the width of the narrow pulses. Therefore, the exact value of the decision point is not critical. In the illustrative embodiment, the value of the decision point is chosen to be equal to a number which would result from a pulse having a duration midway between the narrow and the wide pulses. This decision number is used in making all decisions in the synchronization routine and is stored in the computer memory before the routine begins. It may be changed in order to improve noise rejection characteristics and signal handling.

In accordance with the invention, the computer sequentially activates several pulse duration measuring routines in order to detect a pulse sequence consisting of a "narrow" pulse followed by a "wide" pulse. An inspection of FIGS. 2 and 3 shows that this pattern only occurs at a bit cell boundary (for example, bit cell boundaries 200 and 300 in FIGS. 2 and 3, respectively). When this sequence is detected, as will be hereinafter explained, bit cell transitions can be determined from the polarity sense of the pulses in the sequence.

Specifically, if the high pulse count number is not greater than the decision number, it is an indication that the pulse is "narrow". In this case the computer routine proceeds to step 420 in which the count low pulse subroutine shown in FIG. 6 (and described more detail hereinafter) is performed.

In step 425 the computer routine compares the low count number resulting from the count low pulse routine to the decision point. If the low count is greater than the decision point, thereby indicating a "wide" pulse, the computer recognizes a predetermined sequence of a "narrow" pulse followed by a "wide" pulse and the routine proceeds to step 430.

In accordance with the invention a "high" "narrow" pulse followed by a "low" "wide" pulse indicates that bit cell boundaries occur on falling edges. Accordingly, the computer increments the falling edge counter in step 430. In summary, by proceeding through steps 410-430 the computer has detected a pulse pattern consisting of a "narrow" "high" pulse followed by a "wide" "low" pulse, which pulse pattern is illustratively used to detect the waveform in which the falling edges correspond to bit cell boundaries.

In step 435, the falling edge counter is compared to a predetermined number of determine whether a predetermined number of the same pulse patterns have been detected. Repetitive detection of a particular pulse pattern is necessary to eliminate false detections of a pattern caused by noise in the system. The illustrative system requires 96 repetitive detections of a particular pattern before a synchronization decision is made. If 96 falling edges have been detected then the computer proceeds to step 440 and saves the edge status (which in this case is falling) to be used as the bit cell boundary during the byte synchronization routine and exits from the routine via step 441. If 96 edges have not been detected the computer returns to reexecute step 400 and repeat the entire routine.

Another branch of the routine is executed when, at step 415, the initial high pule count is greater than the decision point. In this case, a "wide" "high" pulse is indicated and the computer routine proceeds to step 445 in which it determines the duration of the subsequent "low" pulse. If the resulting low count is greater than the decision point indicating a "wide" "low" pulse, the computer routine returns to step 410 to determine the width of the subsequent "high" pulse.

If, on the other hand, the resulting low count in step 450 is less than the decision point, the computer then proceeds to step 455 in which it determines the duration of the succeeding "high" pulse. If the succeeding "high" pulse is "wide" as indicated by a high count greater than the decision point, the computer proceeds to step 465, having detected a "narrow" "low" pulse followed by a "wide" "high" pulse.

In accordance with the invention, such a pulse pattern indicates that a rising edge is to be used as a bit cell boundary. In this case, the rising edge counter is incremented in step 465 and the computer then checks the count to detect whether 96 rising edges have been detected in step 470. If so, the rising edge status is saves in step 440. If not, the computer proceeds back to step 400 and repeats the routine until 96 rising edges have been detected.

If at step 460, however, the high count indicates a "narrow" "high" pulse rather than a "wide" "high" pulse, the computer has then detected a pulse sequence consisting of a "narrow" "low" pulse followed by a "narrow" "high" pulse and proceeds to step 420 to determine the duration of the succeeding "low" pulse. The program thus has internal loops so that, if during a particular succession of pulses, the predetermined pulse pattern of a "narrow" pulse followed by a "wide" pulse is not detected, the computer continues to time the duration of succeeding pulses until the proper pulse pattern is detected, at which time the appropriate edge counter is incremented.

The subroutine which is used to determine the duration of the high pulses is shown in FIG. 5. The routine begins with step 500 in which the port status is checked. In step 510, if the port is "high", the routine proceeds to step 530 in which the high count is incremented and then the port status is again checked in step 500. This process is repeated until the port becomes "low" at which point (in step 520) the routine returns to the point in the main routine in FIG. 4 at which it was called. Therefore, the routine produces a count number which is proportional to the time duration between a rising edge and a subsequent falling edge.

A similar routine in for determining the duration of the low pulses is shown in FIG. 6. The routine begins with the checking of the input port status in step 600. In step 610, if the data at the port remains "low", the low count is incremented in step 630 and the subroutine is repeated. At the point where the port becomes "high", the subroutine returns to the main routine via step 620 and produces a count number which is proportional to the time duration between a falling edge and a subsequent rising edge.

After a bit synchronization has been achieved by means of the computer routines shown in FIGS. 4–6, incoming bits can be detected by timing the time duration between successive rising or falling edges (whichever is chosen as representative of bit cell boundaries) and comparing the timed durations to predetermined limits to establish whether the pulse represents a "0" or "1". Byte synchronization is achieved by inserting successively detected bits into a shift register. The bits in the shift register are then examined to determine whether a synchronization word (illustratively, "3C" in hexadecimal notation) is present. When this pattern is detected the system is considered bit and byte synchronized.

In addition to the computer routines shown which implement an automatic repetition to eliminate noise problems, the pulse counting routines may also incorporate a noise rejection feature in which a pulse is rejected as noise if it is narrower or wider than predetermined limits. In order to clarify the description these routines have not been shown in detail, however, their inclusion into the routines described would be obvious to one skilled in the art.

Although one illustrative embodiment of the invention has been shown other modifications and changes within the spirit and scope of the invention would occur to those skilled in the art. For example, it is apparent that different pulse patterns from that shown in the illustrative embodiment may be used to detect bit cell boundaries, and that a pulse pattern consisting of any two successive pulses may be detected and the bit cell boundaries determined from the polarity of either of the pulses.

A computer program which performs the routines shown in FIGS. 4, 5 and 6 which is coded in MC6809 machine language suitable for use with the MC6809 integrated processor chip manufactured by Motorola, Inc. Phoenix, Ariz. is shown on the following pages. This code is explained and described in the MC6809 User's Programming Manual published by Motorola, Inc. Phoenix, Ariz.

```
00010 00001              *

00010 00848                       OPT    L 00020 00849A A701                 ORG    $A701

00030 00850              * CASSETTE INPUT ROUTINES 00040 00851              *

00050 00852              * EQUATES 00060 00853       0085  A OLDWAY  EQU    $85

00070 00854       0091  A HILOW   EQU    $91

00080 00855              *

00090 00856              * TURN MOTOR ON, READ A BLOCK, AND TURN MOTOR OFF 00100 00857A A701 8D  79  A77C  RDBLK  BSR   CSRDON  TURN ON MOTOR AND SYNC UP 00110 00858A A703 8D  06  A70B         BSR   BLKIN   READ A BLOCK 00120 00859A A705 BD      A7E9  A RDBFIN JSR CASOFF  TURN MOTOR OFF AND ENABLE INTERRUPTS 00130 0086 0A A708 D6  81   A          LDB   CSRERR  B=ERROR CODE AND SET CONDITION CODES 00140 00861A A70A 39                   RTS 00150 00862              *

00160 00863              *

00170 00864              * BLKIN READS A BLOCK FROM CASETTE 00180 00865              * ON ENTRY CBUFAD CONTAINS THE BUFFER ADDRESS 00190 00866              * ON EXIT -

00200 00867              * BLTYP AND BLKLEN ARE SET UP 00210 00868              * Z=1 AND A=CSRERR=0 IF NO ERRORS OCCURED 00220 00869              * Z=0 IF AN ERROR OCCURED AND A=CSRERR=1 FOR A CHECKSUM ERROR
```

```
00230 00870               * AND 2 FOR A MEMORY ERROR
00240 00871               * UNLESS A MEMORY ERROR OCCURS X=CBUFAD+BLKNEW
00250 00872               * IF A MEMORY ERROR OCCURS, X POINTS ONE BEYOND THE BAD ADDRESS
00260 00873               *
00270 00874               * CC, A, B, X ARE MODIFIED. THE OTHERS ARE PRESERVED.
00280 00875               * INTERRUPTS ARE LEFT DISABLED
00290 00876               *
00300 00877A A70B 1A  50        A BLKIN  ORCC   #$50      ;D INTERRUPTS DURING TIMING LOOPS
00310 00878A A70D 8D  E4  A6F3            BSR   BLINKS    BLINK THE CHARACTER IF SHOWING NAMES.
00320 00879A A70F 9E  7E        A         LDX   CBUFAD    GET THE BUFFER ADDRESS
00330 00880A A711 4F                      CLRA            START WITH A ZERO BYTE
00340 00881A A712 8D  41  A755 SYNLP BSR  BITIN     READ A BIT
00350 00882A A714 46                      RORA            ROTATE IT INTO THE BYTE
00360 00883A A715 81  36        A         CMPA  #$36      IS IT THE SYNC BYTE
00370 00884A A717 26  F9  A712            BNE   SYNLP     NO, LOOK FURTHER
00380 00885A A719 8D  2E  A749            BSR   CBIN      YES, READ AND STORE THE BLOCK TYPE
00390 00886A A71B 97  7C        A         STA   BLKTYP
00400 00887A A71D 8D  2A  A749            BSR   CBIN      READ AND STORE THE BLOCK LENGTH
00410 00888A A71F 97  7D        A         STA   BLKLEN
00420 00889A A721 9B  7C        A         ADDA  BLKTYP    INIT THE CHECKSUM
00430 00890A A723 97  80        A         STA   CHKSUM
00440 00891A A725 96  7D        A         LDA   BLKLEN    SET UP LOOP COUNT
00450 00892A A727 97  81        A         STA   BYTCNT
00460 00893A A729 27  10  A73B            BEQ   NODATA    NO DATA IN THIS RECORD, JUST GO.
00470 00894               * CHECK THE CHECKSUM
00480 00895A A72B 8D  1C  A749 BLKILP BSR  CBIN     READ A BYTE OF DATA
00490 00896A A72D A7  84        A         STA   ,X        PUT IT AWAY
00500 00897A A72F A1  80        A         CMPA  ,X+       SEE IF STORED OK.
00510 00898A A731 26  11  A744            BNE   BADMEM    IF NOT, RETURN A MEMORY ERROR
00520 00899A A733 9B  80        A         ADDA  CHKSUM    IT DID, UPDATE THE CHECKSUM
00530 00900A A735 97  80        A         STA   CHKSUM
00540 00901A A737 0A  81        A         DEC   BYTCNT    MORE BYTES TO READ?
00550 00902A A739 26  F0  A72B            BNE   BLKILP    YES, GO READ THE NEXT ONE.
00560 00903A A73B 8D  0C  A749 NODATA BSR  CBIN     NO, READ THE CHECKSUM.
00570 00904A A73D 90  80        A         SUBA  CHKSUM    DOES IT AGREE WITH THE CALCULATED ONE?
00580 00905A A73F 27  05  A746            BEQ   OKREAD    YES.
00590 00906A A741 86  01        A         LDA   #1        NO, INDICATE A CHECKSUM ERROR OCCURED.
00600 00907A A743       8C        A       FCB   $8C
00610 00908A A744 86  02        A BADMEM LDA   #2        INDICATE A MEMORY ERROR OCCURED.
00620 00909A A746 97  81        A OKREAD STA   CSRERR
00630 00910A A748 39                      RTS
00640 00911               *
00650 00912               * READ BYTE FROM TAPE INTO A.
00660 00913A A749 86  08        A CBIN   LDA   #8        SET UP BIT COUNT
00670 00914A A74B 97  82        A         STA   CNT1
00680 00915A A74D 8D  06  A755 CBINLP BSR  BITIN    READ THE NEXT BIT
00690 00916A A74F 46                      RORA
00700 00917A A750 0A  82        A         DEC   CNT1
00710 00918A A752 26  F9  A74D            BNE   CBINLP
00720 00919A A754 39                      RTS
```

```
00730 00920                      *
00740 00921                      * READ A BIT FROM TAPE.
00750 00922                      * THE BIT RETURNED IN THE CARRY.
00760 00923                      *
00770 00924A A755 8D    06   A75D BITIN   BSR    DOCNT    DO THE COUNTING
00780 00925A A757 D6    83   A           LDB    CCOUNT   IF COUNT .GT SPEED, BIT IS A 0.
00790 00926A A759 5A                     DECB
00800 00927A A75A D1    9F   A           CMPB   SPEED    SET CARRY FOR 1, CLEAR CARRY FOR 0.
00810 00928A A75C 39                     RTS
00820 00929                      *
00830 00930                      * COUNTING ROUTINES
00840 00931                      *
00850 00932A A75D 0F    83   A   DOCNT   CLR    CCOUNT   CLEAR THE COUNT
00860 00933A A75F 0D    84   A           TST    CLHFLG   COUNT LOW THEN HIGH
00870 00934A A761 26    10   A773         BNE    CNTLH    YES, GO DO IT
00880 00935                      * OR COUNT HIGH THEN LOW
00890 00936A A763 8D    07   A76C CNTHL   BSR    CNT      COUNT THE HIGH PULSE
00900 00937A A765 25    FC   A763         BCS    CNTHL
00910 00938A A767 8D    03   A76C CNTL    BSR    CNT      COUNT THE LOW PULSE
00920 00939A A769 24    FC   A767         BCC    CNTL
00930 00940A A76B 39                     RTS
00940 00941A A76C 0C    83   A   CNT     INC    CCOUNT   INCREMENT THE COUNT
00950 00942A A76E F6    FF20 A           LDB    PIAIAD   SAMPLE THE INPUT OF PIA
00960 00943A A771 56                     RORB            MOVE BIT INTO CARRY
00970 00944A A772 39                     RTS
00980 00945A A773 8D    F7   A76C CNTLH   BSR    CNT      COUNT THE LOW PULSE
00990 00946A A775 24    FC   A773         BCC    CNTLH
01000 00947A A777 8D    F3   A76C CNTH    BSR    CNT      COUNT THE HIGH PULSE
01010 00948A A779 25    FC   A777         BCS    CNTH
01020 00949A A77B 39                     RTS
01030 00950                      * THIS ROUTINE TURNS ON THE CASSETTE AND SYNCS TO THE PROPER
01040 00951                      * EDGE OF THE TAPE DATA
01050 00952                      *
01060 00953A A77C 1A    50   A   CSRDON  ORCC   #$50     NO INTURRUPTS DURING CASETTE I/O.
01070 00954A A77E 8D    4A   A7CA         BSR    CASON    TURN ON CASETTE MOTOR.
01080 00955A A780 0F    82   A           CLR    CNT1     CLEAR SYNC LOOP COUNTER.
01090 00956A A782 8D    DF   A763 SYCLP   BSR    CNTHL    DETECT THE RISING EDGE.
01100 00957A A784 8D    27   A7AD TRYHGH  BSR    KNTHGH   COUNT THE HIGH PULSE.
01110 00958A A786 22    0F   A797         BHI    TRYLOW   COUNT TO HIGH, TRY THE LOW PULSE.
01120 00959A A788 8D    1D   A7A7 GOODHI  BSR    KNTLOW   HIGH COUNT OK, COUNT THE LOW PULSE
01130 00960A A78A 25    0F   A79B         BLO    GOODLO   THE LOW COUNT WAS VALID, GO COUNT HIGH
01140 00961A A78C 0A    82   A           DEC    CNT1     GOOD FALLING EDGE SYNC.
01150 00962                      * NOW INCREMENT THE FALLING EDGE SYNC COUNT
01160 00963A A78E 96    82   A           LDA    CNT1     HAVE WE SEEN 96?
01170 00964A A790 81    A0   A           CMPA   #-96     (FALLING EDGE SYNC COUNT IS NEGATIVE).
01180 00965A A792 26    EE   A782 CHKCNT  BNE    SYCLP    NOT ENOUGH, LOOK FOR MORE
01190 00966A A794 97    84   A           STA    CLHFLG   WE HAVE SEEN 96 SYNCS, SET CLHFLG.
01200 00967A A796 39                     RTS
01210 00968                      * IF THEY WERE FALLING EDGE SYNCS TO SAY COUNT HIGH THEN
01220 00969                      * LOW WHEN READING A BIT. (A=-96)
```

```
01230 00970                    * CLEAR CLHFLG IF THEY WERE RISING EDGE TO SAY COUNT LOW
01240 00971                    * THEN HIGH WHEN READING (A=0 FROM SUBAIM)
01250 00972                    *
01260 00973A A797 8D  0E  A7A7 TRYLOW BSR   KNTLOW   COUNT THE LOW PULSE
01270 00974A A799 22  E9  A784        BHI   TRYHGH   TOO LONG, GO TRY THE HIGH PULSE
01280 00975A A79B 8D  10  A7AD GOODLO BSR   KNTHGH   OK, COUNT THE HIGH PULSE.
01290 00976A A79D 25  E9  A788        BLO   GOODHI   THE HIGH PULSE WAS GOOD
01300 00977A A79F 0C  82   A          INC   CNT1     GOOD RISING EDGE SYNC, INCREMENT.
01310 00978A A7A1 96  82   A          LDA   CNT1     THE RISING EDGE SYNC COUNT.
01320 00979A A7A3 80  60   A          SUBA  #96      HAVE WE SEEN 96
01330 00980A A7A5 20  EB  A792        BRA   CHKCNT   GO SEE IF DONE.
01340 00981                    * NOTE THAT IF WE ARE DONE A=0 SO CLHFLG WILL BE CLEARED
01350 00982                    *
01360 00983A A7A7 0F  83   A   KNTLOW CLR   CCOUNT   CLEAR THE OLD COUNT.
01370 00984A A7A9 8D  BC  A767        BSR   CNTL     COUNT THE LOW PULSE.
01380 00985A A7AB 20  04  A7B1        BRA   KNTFIN   GO TO NOISE REJECTION.
01390 00986A A7AD 0F  83   A   KNTHGH CLR   CCOUNT   CLEAR THE OLD COUNT.
01400 00987A A7AF 8D  C6  A777        BSR   CNTH     COUNT THE HIGH PULSE.
01410 00988A A7B1 D6  83   A   KNTFIN LDB   CCOUNT   IF THE COUNT IS GREATER THAN NOISE
01420 00989A A7B3 D1  90   A          CMPB  NOISE    START OVER.
01430 00990A A7B5 22  03  A7BA        BHI   SCLR
01440 00991A A7B7 D1  91   A          CMPB  HILOW    MAKE HIGH/LOW TEST AND RETURN WITH
01450 00992A A7B9 39                  RTS            CONDITION CODES REFLECTING THIS TEST
      00993A  0F   83   A   SCLR  CLR   CNT1   START OVER BY CLEARING EDGE COUNT.
           2C 39                  RTS

*
                    * "MOTOR ON" TURNS THE CASETTE MOTOR ON.
                    * "MOTOR OFF" TURNS THE CASETTE MOTOR OFF.
                    *
      3D 1F  89        A  MOTOR  TFR   A,B       SAVE THE ON OR OFF TOKEN.
      3F 9D  9F        A         JSR   CHRGET    EAT IT FOR NEWSTT.
      C1 C1  AA        A         CMPB  #OFFTK    IS IT A "MOTOR OFF"
      C3 27  24   A7E9           BEQ   CASOFF    YES, GO DO IT.
      C5 C1  88        A         CMPB  #ONTK     NO, HOW ABOUT "MOTOR ON"
      C7 BD  A5C9      A         JSR   ZERCHK    GIVE AN ERROR IF NOT.
                    * YES, FALL INTO MOTOR ON.
                    *
                    * TURN CASETTE MOTOR ON AND DELAY FOR 1/2 SECOND
                    *
      CA B6  FF21     A  CASON  LDA   PIA1AC    SET BIT 3 OF PIA CONTROL REG.
      CD 8A  08        A         ORA   #8
      CF 8D  1F   A7F0           BSR   STA1AC
      D1 9E  8A        A  DELHAF LDX   DBLZER    DELAY FOR ABOUT 1/2 SECOND.
      D3 30  1F        A  DELAY  LEAX  -1,X
      D5 26  FC   A7D3           BNE   DELAY
      D7 39                      RTS
                    *
                    * TURN ON THE MOTOR AND WRITE THE BIT SYNC LEADER OF HEX 55S.
                    *
```

```
 D8 1A   50     A WRTLDR ORCC  #$50      NO INTERRUPTS DURING CASETTE I/O.
 DA 8D   EE       A7CA   BSR   CASON     TURN ON THE MOTOR.
CBAS2 - .SA:0

A A7DC 9E  92   A        LDX   LDRLEN    X=NUMBER OF LEADER CHARS TO OUTPUT
2A A7DE 8D  48   A828 LDRLOP BSR LDRBYT
3A A7E0 30  1F   A        LEAX  -1,X
4A A7E2 26  FA   A7DE     BNE   LDRLOP
5A A7E4 39                RTS
 6                *
 7                * WRTBLK TURNS THE MOTOR ON, OUTPUTS A LEADER, WRITES A BLOCK
 8                * OF DATA AND TURNS OFF THE MOTOR.
 9                * ON ENTRY, BLKTYP, BLKLEN, AND CBUFAD MUST BE SET UP.
 0                * ON EXIT X CONTAINS CBUFAD+BLKLEN
 1                *
2A A7E5 8D  F1   A7D8 WRTBLK BSR  WRTLDR  TURN ON MOTOR AND WRITE LEADER.
3A A7E7 8D  0B   A7F4 BLKOFF BSR  BLKOUT  OUTPUT THE BLOCK.
 4                * FALL INTO CASOFF TO STOP THE MOTOR.
 5                *
 6                * TURN CASETTE MOTOR OFF.
 7                *
8A A7E9 1C  AF   A CASOFF ANDCC #$AF     INABLE INTURREPTS
9A A7EB B6  FF21 A        LDA   PIA1AC   CLEAR BIT 3 OF PIA CONTROL REG.
0A A7EE 84  F7   A        ANDA  #$F7
 1                *
2A A7F0 B7  FF21 A STA1AC STA   PIA1AC
3A A7F3 39                RTS
 4                * BLKOUT OUTPUTS A BLOCK OF DATA
 5                * ON ENTRY, BLKTYP, BLKLEN AND CBUFAD MUST BE SET UP.
 6                * ON EXIT X CONTAINS [CBUFAD+BLKLEN]
 7                *
8A A7F4 1A  50   A BLKOUT ORCC  #$50     NO INTERRUPTS DURING CASETTE I/O.
9A A7F6 D6  7D   A        LDB   BLKLEN   GET THE BLOCK LENGTH.
0A A7F8 D7  81   A        STB   BYTCNT   SAVE FOR OUTPUT LOOP COUNT.
51A A7FA 96 7D   A        DA    BLKLEN   MUST START THE CHECKSUM WITH
52A A7FC 27 07   A805     BEQ   ZERLEN   NO DATA IN BLOCK.
53A A7FE 9E 7E   A        LDX   CBUFAD   COMPUTE THE CHECKSUM. NOTE THAT THIS
54A A800 AB 80   A CHKSLP ADDA  ,X+      DONE PRIOR TO RATHER THAN WHILE
55A A802 5A               DECB           WRITING THE DATA TO MINIMIZE THE BYTE
56A A803 26 FB   A800     BNE   CHKSLP   TO BYTE DELAY WHILE WRITING.
57A A805 9B 7C   A ZERLEN ADDA  BLKTYP   THE BLOCK TYPE IS INCLUDED IN
58A A807 97 80   A        STA   CHKSUM   THE CHECKSUM.
59A A809 9E 7E   A        LDX   CBUFAD   SET UP THE DATA POINTER.
60A A80B 8D 1B   A828     BSR   LDRBYT   WRITE A LEADER BYTE.
61A A80D 86 3C   A        LDA   #$3C     FOLLOW IT WITH A SYNC BYTE.
62A A80F 8D 19   A82A     BSR   CBOUT
63A A811 96 7C   A        LDA   BLKTYP   SEND OUT THE BLOCK TYPE.
64A A813 8D 15   A82A     BSR   CBOUT
65A A815 96 7D   A        LDA   BLKLEN   FOLLOW WITH THE BLOCK LENGTH.
```

```
66A A817 8D    11    A82A              BSR    CBOUT
67A A819 4D                            TSTA          ANY DATA TO WRITE?
68A A81A 27    08    A824              BEQ    OUTCHK NO. JUST GO OUTPUT THE CHECKSUM.
69A A81C A6    80    A BLKOLP LDA      ,X+           YES, OUTPUT THE DATA.
70A A81E 8D    0A    A82A              BSR    CBOUT
71A A820 0A    81    A       DEC       BYTCNT
72A A822 26    F8    A81C              BNE    BLKOLP
73A A824 96    80    A OUTCHK LDA      CHKSUM        OUTPUT THE CHECKSUM AND FALL INTO
74A A826 8D    02    A82A              BSR    CBOUT  LDRBYT TO WRITE A TRAILING BYTE.
75                            *
76                            * LDRBYT WRITES A 55 HEX LEADER CHARACTER.
77                            *
78A A828 86    55    A LDRBYT LDA      #$55          LEADER BYTE
0 01079                       * FALL INTO CBOUT TO OUTPUT IT.
0 01080                       *
0 01081                       * CBOUT OUTPUTS THE BYTE IN A AND UPDATES THE CHECKSUM.
0 01082                       *
0 01083A A82A 34    02    A CBOUT  PSHS A            SAVE THE BYTE
0 01084A A82C C6    01    A        LDB  #1           SET UP A MASK TO GET THE LSB FIRST.
0 01085A A82E 96    85    A CBOLP  LDA  OLDWAY       OUTPUT THE LAST PIECE OF THE OLD.
0 01086A A830 B7    FF20  A        STA  PIA1AD       SINEWAVE
0 01087A A833 108E  A85C  A        LDY  #SINTBL      POINT TO SINEWAVE TABLE.
0 01088A A837 E5    E4    A        BITB ,S           MASK OFF THE CURRENT BIT.
0 01089A A839 26    0D    A848     BNE  EQONE        IT IS A ONE, SO HANDLE IT.
0 01090A A83B A6    A0    A EQZERO LDA  ,Y+          OUTPUT EVERY TABLE VALUE TO GET
0 01091A A83D 108C  A880  A        CMPY #ESINTB      THE LOWER FREQUENCY FOR A 0 BIT.
0 01092A A841 27    12    A855     BEQ  FINBIT
0 01093A A843 B7    FF20  A        STA  PIA1AD
0 01094A A846 20    F3    A83B     BRA  EQZERO
0 01095A A848 A6    A1    A EQONE  LDA  ,Y++         OUTPUT EVERY OTHER TABLE VALUE TO
0 01096A A84A 108C  A880  A        CMPY #ESINTB      GET THE HIGHER FREQUENCY FOR A 1 BIT.
0 01097A A84E 27    05    A855     BEQ  FINBIT
0 01098A A850 B7    FF20  A        STA  PIA1AD
0 01099A A853 20    F3    A848     BRA  EQONE
0 01100A A855 97    85    A FINBIT STA  OLDWAY       SAVE THE LAST VALUE SO WE CAN OUTPUT.
0 01101A A857 58                   ASLB              ROTATE THE BIT MASK.
0 01102A A858 24    D4    A82E     BCC  CBOLP        WHEN IT GETS INTO C WE ARE DONE
0 01103A A85A 35    82    A        PULS A,PC
0 01104                            * THE SINEWAVE TABLE
0 01105                            * BIT 1 OF ALL ENTRIES IS HIGH SO THE RS232 OUTPUT IS HELD HIGH.
0 01106                            *
0 01107A A85C 82    A SINTBL FCB    $82,$92,$AA,$BA,$CA,$DA,$EA,$F2,$FA,$FA,$F2,$EA
0 01108A A869 DA    A        FCB    $DA,$CA,$BA,$AA,$92,$82,$6A,$5A,$42,$32,$22,$12,$0A,$02,$02,$02
                                                                                            $0A
0 01109A A879 0A    A        FCB    $0A,$12,$22,$32,$42,$52,$6A
0 01110       A880  A ESINTB EQU    *
0 01111                      END
ERRORS 00000--00000
WARNINGS 00000--00000
```

What is claimed is:

1. In a digital information processing system wherein digital information is encoded in an encoding waveform in a series of bit cells, each bit cell having one of two distinct time durations and containing a portion of said encoding waveform and its inverse, said system having means for inserting into said bit cell series a predetermined synchronization pattern consisting of bit cells having one of said time durations alternating with bit cells having the other of said time durations, synchronizing apparatus for detecting bit cell boundaries in said bit cell series and in the inversion of said bit cell series comprising:

means responsive to said encoding waveform for timing the duration of at least two sequential waveform portions of said synchronization pattern, said timing means generating an output corresponding to each sequential waveform portion wherein the magnitude of said output is representative of the time duration of the corresponding sequential waveform portion, means responsive to timed duration of portions of said synchronization pattern for detecting predetermined pattern of durations, said detecting means including means for comparing the magnitude of said timing means output to a predetermined decision number and means for detecting a series of timing means outputs which are either greater than or less than said decision number in a predetermined pattern, and means responsive to the detection of said patterns for locating said bit cell boundaries, said locating means being responsive to one of said predetermined patterns for selecting positive-going transitions as cell boundaries and being responsive to another of said patterns for selecting negative-going transitions as cell boundaries.

2. In a digital information processing system wherein digital information is encoded in a series of bit cells, each bit cell having either a first or a second distinct time duration and consisting of a positive pulse and its inversion, said system having means for inserting into a predetermined location in said bit cell series a synchronizing pattern consisting of alternating bit cells of first and second duration, synchronizing apparatus for detecting the boundaries between bit cells in the bit cell series and in an inverted bit cell series comprising, means responsive to said sychronizing pattern for timing the durations of at least two successive pulses, means responsive to the timed duration of said successive pulses for determining a predetermined pattern of durations, and means responsive to the detection of one of said predetermined patterns of durations for selecting positive-going transitions as the boundary between successive bit cells and means responsive to another of said predetermined patterns of durations for selecting negative-going transitions as the boundary between said bit cells.

3. In a digital information processing system, synchronizing apparatus according to claim 2 wherein said timing means produces a first and a second number respectively representative of the time duration of each sequential waveform portion.

4. In a digital information processing system, synchronizing apparatus according to claim 3 wherein said detecting means includes means responsive to said first and said second numbers and to a predetermined decision number for detecting a pulse sequence wherein said first number is less than said decision number and said second number is greater than said decision number.

5. In a digital information processing system, synchronizing apparatus according to claim 4 wherein said selecting means is responsive the detection of said pulse sequence and is further responsive to the sense of said pulses for selecting positive-going transitions as cell boundaries when said pulse sequence is detected and the first pulse in said sequence is inverted and for selecting negative-going transitions as cell boundaries when said pulse sequence is detected and said first pulse is positive.

6. In a digital to frequency modulation interface for a computer system in which digital information bits are encoded in bit cells, each bit cell consisting of a single cycle of an oscillatory waveform having one of two distinct frequencies, said system having means for inserting into a predetermined location in said bit cell series a synchronizing pattern consisting of bit cells containing waveforms of said first frequency alternating with bit cells containing waveforms of said second frequency, synchronizing apparatus for detecting the boundaries between bit cells, in a bit cell series and in an inverted bit cell series comprising, means responsive to said synchronizing pattern for producing a first and a second number respectively representative of the time durations of at least two sequential half cycles of said waveform, means responsive to said first and said second numbers and to a predetermined decision number for detecting a waveform cycle sequence wherein said first number is less than said decision number and said second number is greater than said decision number, and means responsive the detection of said waveform cycle sequence and further responsive to the sense of said waveform cycles for selecting positive-going transitions as bit cell boundaries when said half cycle sequence is detected and the first half cycle of said sequence is inverted and for selecting negative-going transitions as bit cell boundaries when said half cycle sequence is detected and said first half cycle is positive.

7. Synchronizing apparatus according to claim 6 wherein said producing means further comprises, means responsive to said waveform for determining a sequence of half cycles consisting of an inverted half cycle followed by a positive half cycle, a high counter, a low counter, means responsive to the sense of said waveform for periodically incrementing said high counter when said waveform is positive, and means for periodically incrementing said low counter when said waveform is inverted.

8. Synchronizing apparatus according to claim 7 wherein said detecting means comprises means for comparing the count in said high counter to said predetermined decision number and means for comparing the count in said low counter to said predetermined decision number.

9. Synchronizing apparatus according to claim 8 wherein
said selecting means comprises,
a falling edge counter,
a rising edge counter, means for incrementing said rising edge counter when a half cycle sequence is detected which consists of an inverted pulse for which the corresponding count in said low counter is less than said decision number followed by a positive half cycle for which the corresponding count in said high counter is greater than said decision number, and means for incrementing said falling edge counter when a half cycle sequence is detected which consists of an positive pulse for which the corresponding count in said high counter is less than said decision number followed by an inverted half cycle for which the corresponding count in said low counter is greater than said decision number.

10. Synchronizing apparatus according to claim 9 wherein
said selecting means further comprises,
means responsive to the count in said rising edge counter for for selecting bit cell boundaries to be positive-going transitions when the count in said rising edge counter equals to a predetermined number, and
means responsive to the count in said falling edge counter for selecting bit cell boundaries to be negative-going transitions when the count in said falling edge counter equals a predetermined number.

11. In a digital information processing system wherein digital information is encoded in a series of cells, each cell having one of two distinct time durations and containing a portion of an encoding waveform and its inverse, said system having means for inserting into said bit cell series a predetermined synchronization pattern consisting of bit cells having one of said time durations alternating with bit cells having the other of said time durations, a method for detecting bit cell boundaries in said bit cell series and in the inversion of said bit cell series comprising the steps of:
A. timing the duration of at least two sequential waveform portions of said synchronization pattern, said timing step including the substeps of:
A'. checking the sense of a waveform portion,
A". periodically incrementing a high count if said waveform portion is positive, and
A'". periodically incrementing a low count if said waveform portion is inverted,
B. detecting predetermined patterns of durations, and
C. locating said bit cell boundaries based on the detection of said patterns.

12. A method according to claim 11 wherein step B comprises the steps of:
G. detecting a waveform sequence consisting of an inverted portion followed by a positive portion,
H. determining the duration of said positive portion,
I. comparing the duration of said positive portion to a predetermined duration,
J. determining the duration of a next inverted portion, which immediately succeeds said positive portion,
K. comparing the duration of said next inverted portion to said predetermined duration,
L. incrementing a falling edge count if said positive portion has a duration less than said predetermined duration and said next inverted portion has a duration greater than said predetermined duration.

13. A method according to claim 12 wherein step B further comprises the steps of:

M. determining the duration of a next positive portion which immediately succeeds said next inverted portion if said next inverted portion has a duration less than said predetermined duration,
N. determining the duration of a second next inverted portion which immediately succeeds said next positive portion if said next positive portion has a duration less than said predetermined duration,
O. determining the duration of a next inverted portion which immediately succeeds said positive portion if said positive portion has a duration greater than said predetermined duration,
P. determining the duration of a next positive portion which immediately succeeds said next inverted portion if said next inverted portion has a duration less than said predetermined duration,
Q. incrementing a rising edge counter if the duration of said next positive portion is greater than said predetermined duration, and
R. repeating steps J, K and L if the duration of said next positive portion is less than said predetermined duration.

14. In a digital to frequency modulation interface for a computer system in which digital information bits are encoded in bit cells, each bit cell consisting of a single cycle of an oscillatory waveform having one of two distinct frequencies, said system having means for inserting into a predetermined location in said bit cell series a synchronizing pattern consisting of bit cells containing waveforms of said first frequency alternating with bit cells containing waveforms of said second frequency, a method for detecting the boundaries between bit cells in a bit cell series and in an inverted bit cell series comprising the steps of:
A. generating a first and a second number respectively representative of the time durations of at least two sequential half cycles of said waveform,
B. detecting a waveform half cycle sequence wherein said first number is less than a predetermined decision number and said second number is greater than said decision number,
C. selecting positive-going transitions as bit cell boundaries when said half cycle sequence is detected and the first half cycle of said half cycle sequence is inverted, and
D. selecting negative-going transitions as bit cell boundaries when said half cycle sequence is detected and said first half cycle is positive.

15. A method according to claim 14 wherein step A comprises the steps of:
E. checking the sense of portions of said waveform,
F. periodically incrementing a first number count if said waveform is a positive half cycle, and
G. periodically incrementing a second number count if said waveform is an inverted half cycle.

16. A method according to claim 15 wherein step B comprises the steps of:
H. detecting a waveform sequence consisting of an inverted half cycle followed by a positive half cycle,
I. determining the duration of said positive half cycle,
J. comparing the duration of said positive half cycle to a predetermined duration,
K. determining the duration of a next inverted half cycle, which immediately succeeds said positive half cycle,
L. comparing the duration of said next inverted half cycle to said predetermined duration, 17. A method according to claim 16 wherein step B further comprises the steps of:
- O. determining the duration of a next positive half cycle which immediately succeeds said next inverted half cycle if said next inverted half cycle has a duration less than said predetermined duration,
- P. determining the duration of a second next inverted half cycle which immediately succeeds said next positive half cycle if said next positive half cycle has a duration less than said predetermined duration,
- Q. determining the duration of a next inverted half cycle which immediately succeeds said positive half cycle if said positive half cycle has a duration greater than said predetermined duration,
- R. determining the duration of a next positive half cycle which immediately succeeds said next inverted half cycle if said next inverted half cycle has a duration less than said predetermined duration.

18. A method according to claim 17 wherein step C further comprises the steps of:
- S. incrementing a rising edge counter if the duration of said next positive half cycle is greater than said predetermined duration, and
- T. selecting rising edges as bit cell boundaries if said rising edge count reaches a predetermined count.

19. A method according to claim 16 wherein step D comprises the steps of:
- M. incrementing a falling edge count if said positive half cycle has a duration less than said predetermined duration and said next inverted half cycle has a duration greater than said predetermined duration, and
- N. selecting falling edges as bit cell boundaries said falling edge count reaches a predetermined count.

* * * * *